(12) United States Patent
Monteith

(10) Patent No.: US 11,486,443 B2
(45) Date of Patent: Nov. 1, 2022

(54) FLUID TURBINE GENERATOR

(71) Applicant: Robert Lothar Monteith, Bridgewater, MA (US)

(72) Inventor: Robert Lothar Monteith, Bridgewater, MA (US)

( * ) Notice: Subject to any disclaimer, the term of this patent is extended or adjusted under 35 U.S.C. 154(b) by 81 days.

(21) Appl. No.: 17/301,752

(22) Filed: Apr. 13, 2021

(65) Prior Publication Data
US 2021/0320576 A1 Oct. 14, 2021

Related U.S. Application Data

(60) Provisional application No. 63/009,866, filed on Apr. 14, 2020.

(51) Int. Cl.
| | |
|---|---|
| *H02K 16/02* | (2006.01) |
| *F16C 32/04* | (2006.01) |
| *F03D 3/00* | (2006.01) |
| *F03D 3/06* | (2006.01) |
| *H02K 1/2793* | (2022.01) |
| *H02K 7/00* | (2006.01) |
| *H02K 21/02* | (2006.01) |

(52) U.S. Cl.
CPC .......... *F16C 32/0412* (2013.01); *F03D 3/005* (2013.01); *F03D 3/061* (2013.01); *F03D 3/062* (2013.01); *H02K 1/2793* (2013.01); *H02K 7/003* (2013.01); *H02K 16/02* (2013.01); *H02K 21/028* (2013.01); *F05B 2240/213* (2013.01); *F05B 2250/14* (2013.01); *F05B 2250/241* (2013.01); *H02K 2213/09* (2013.01)

(58) Field of Classification Search
CPC ...... H02K 1/2793; H02K 7/003; H02K 16/02; H02K 21/028; H02K 2213/09
See application file for complete search history.

(56) References Cited

U.S. PATENT DOCUMENTS

| | | | | |
|---|---|---|---|---|
| 5,821,710 A | * | 10/1998 | Masuzawa | H02K 29/08 318/400.14 |
| 7,342,342 B2 | * | 3/2008 | Naitou | H02K 21/026 310/431 |
| 7,948,132 B2 | * | 5/2011 | Tanaka | H02K 1/30 310/90 |
| 2011/0187242 A1 | * | 8/2011 | Takeuchi | H02K 21/02 310/90 |

* cited by examiner

*Primary Examiner* — Dang D Le

(57) ABSTRACT

An axial-flux generator for fluid turbines has a continuously variable generator that is constructed of a pair of rotors that move radially across a stator resulting in varying torque and varying power output. In one embodiment the rotors are normally held proximal to the center of a stator by spring tension. The stator is larger than the normally held position of the rotors. As the angular velocity of the rotors increases, the rotors move radially toward the perimeter of the stator, thus encountering a greater stator surface area providing increased torque, increased power generation and a higher-rated output speed when used with a fluid turbine.

9 Claims, 6 Drawing Sheets

FLUID TURBINE GENERATOR

TECHNICAL FIELD

The present disclosure relates in general to generators for fluid turbines, and more specifically to a variable-torque, axial-flux permanent-magnet synchronous generator and motor.

BACKGROUND

A wind turbine extracts maximum energy from the wind when operating at an optimal rotor speed. Rotor speed depends on wind speed. The optimal rotor speed for a given generator configuration is defined as its rated power. Rotor speed varies with wind variability. Unlike fixed-speed wind turbines, in which rotor speed is approximately constant, variable-speed wind turbines designed to operate over a range of rotor speeds. Varying the rotor speed captures the maximum aerodynamic power in varying wind. Variable-speed operation of a rotor results in higher energy production than that of a system operating at constant speed. Variable-speed operation enables a reduction in dynamic loads that act on a turbine's mechanical components.

A wind turbine's drivetrain controls rotor speed. Current wind-turbine technologies obtain variable speed by use of a variable transmission in the drivetrain. Some of these use continuously-variable transmission (CVT) technology. In traditional transmission-operated turbines, the blades spin a shaft that is connected through a transmission to the generator. The transmission converts the rotational speed of the rotor to an appropriate speed for the generator. The transmission adds complexity and cost to the system.

In axial-flow generators, the magnetic field is parallel to the axis of rotation. These turbines usually have two plates of permanent magnets that generate an axial magnetic field. The plates rotate on an axis collinear to fixed windings between the plates. Relative displacement of the magnets on the windings/coils generates an induced current on the winding/coil. An axial magnetic field motor has the advantages of a simple and compact structure that enables relatively high power/torque density and better heat dissipation.

A wind-turbine power curve illustrates the turbine's power output over a range of wind speeds. A typical power curve starts at a cut-in speed, which is the wind speed at which the turbine begins producing power, then slopes to a rated output speed, which is the wind speed at which the turbine generator is producing at its maximum capacity. The cut-out speed is the wind speed at which a turbine must use some kind of braking to avoid damage to the generator.

A direct-drive generator capable of variable power generation and attendant torque variability would enable a varying rated-output speed. Compared with a typical direct-drive generator, a variable-power generator would enable a relatively lower cut-in speed and a relatively higher cut-out speed.

One skilled in the art understands that both air and water are fluids. The aerodynamic principles that govern a wind turbine may function as hydrodynamic principles in a water turbine. In this disclosure example terms such as "wind" "fluid" and "stream" may be used interchangeably.

SUMMARY

An axial-flux generator for fluid turbines has a continuously variable generator that is constructed of a pair of rotors that move radially across an adjacent stator to provide varying torque and attendant varying power output. In one embodiment the rotors are normally held proximal to the center of a stator by spring tension. The stator is larger than the normally held position of the rotors. As the angular velocity of the rotors increases, the rotors move radially toward the perimeter of the stator, encountering a greater stator surface area providing increased torque, increased power generation and a higher-rated output speed when used with a fluid turbine.

In an example embodiment, an axial-flux, permanent-magnet synchronous generator has an expandable rotor array that rotates about a stator. The rotor array is held at a relatively smaller diameter by spring tension, and expands to a relatively larger diameter as increased wind speed turns a wind turbine rotor, and in turn the generator rotor array, increasing the centrifugal force that causes the generator rotor array to expand. As the wind slows and the rotational velocity of the turbine rotor blades and generator rotor array slows, the spring tension on the generator rotor array pulls the semi-disk-shaped, generator rotor segments back in to the relatively smaller diameter. One skilled in the art understands that generator rotor segments may move radially inward and outward by way of pivoting arms, linear-motion guides and/or linear-motion bearings or other similar means known in the art.

In an example embodiment a variable axial-flux permanent-magnet generator has an array of semi-disk-shaped rotor segments that collapse and expand radially about a stator that is larger in diameter than the rotor array in its collapsed position. The permanent magnets in the rotor segments are arrayed with alternating polarity. The array of rotor segments, in a collapsed configuration, form a substantially disk shape that mates with a substantially disk-shaped stator that is larger in diameter than the diameter of the generator rotor array in its collapsed configuration. The array of rotor segments rotate proximal to, and coaxially with, an array of coils that make up a stator. Each rotor segment is connected to an arm that is connected to a hub at a pivot point. A spring connects the arm to the hub adjacent to the pivot. As the turbine reaches a certain rotational velocity, centrifugal force is exhibited on the generator rotor segments, causing the rotor segment arms to pivot and expand radially against the spring tension. The rotor segments expand to approximately the diameter of the relatively larger-diameter stator. In this configuration the rotor segments are semi-disk shaped segments arrayed about the stator. By staggering the placement of a second array of semi-disk shaped rotor segments on the opposite side of the stator, there is a continuous contact of rotor segment surface area with the surface area of the stator. One skilled in the art understands that the area of expanded rotor segments moves at a greater velocity with respect to the stator outer diameter than the collapsed, relatively smaller-diameter rotor array. The rotor, as it reaches the perimeter, encounters more magnets per revolution, therefore generating more energy. At the same time it encounters more resistance.

The variation in generator torque and power generation provides a relatively lower cut-in speed and a relatively higher cut-out speed than either the smaller or larger diameter rotor arrays would otherwise provide on their own.

DESCRIPTION

Figure 1:
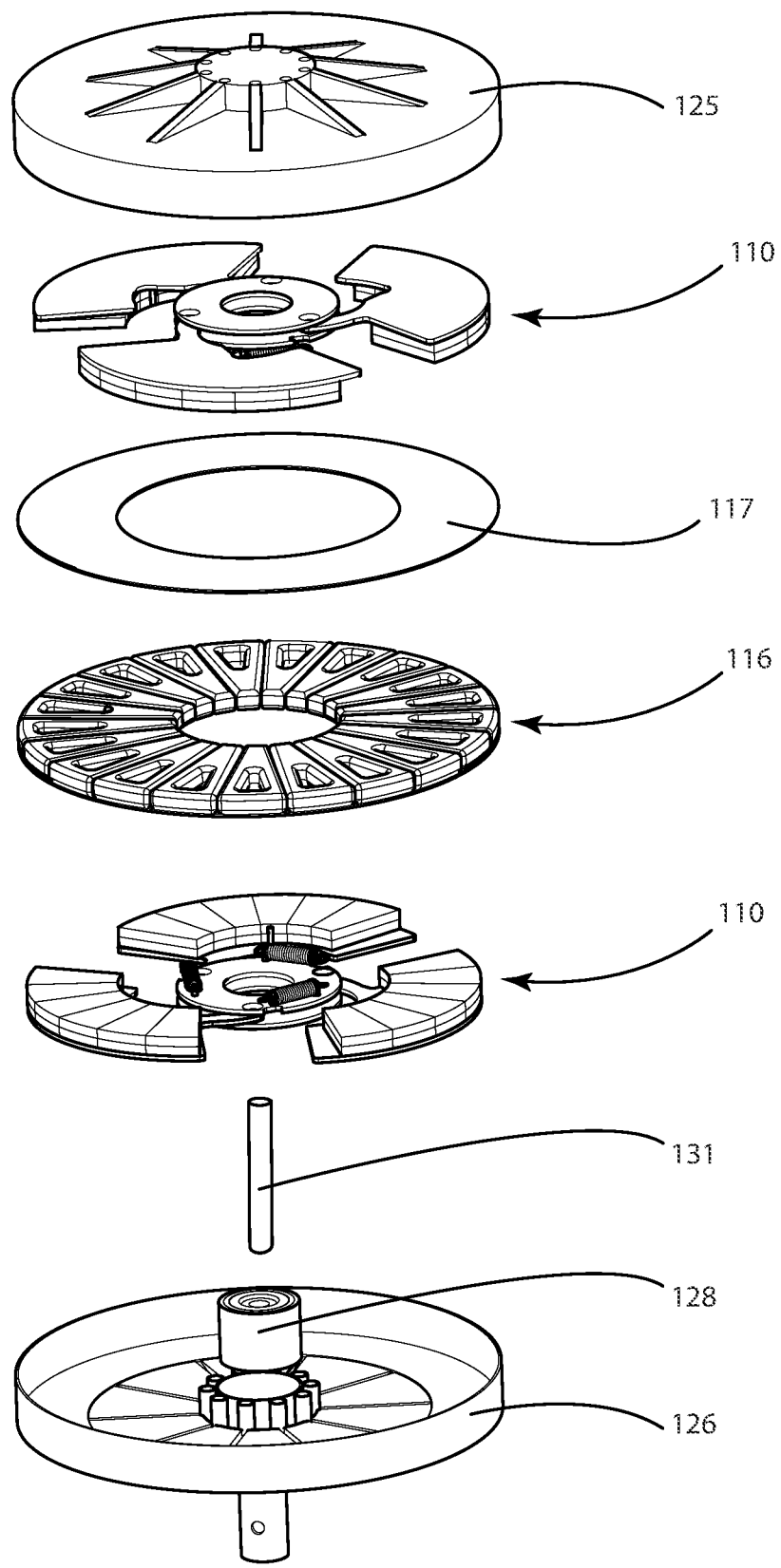
FIG. 1 is a front-perspective, exploded view of an example embodiment.

FIG. 1 shows an exploded view of an example embodiment of a variable axial-flux permanent-magnet synchronous generator 100. An upper housing 125 and lower housing 126 house generator components. Rotor arrays 110 are oriented above and below a stator 116. A stator containment-ring 117 resides between rotor arrays 110 and the stator. One skilled in the art understands that although one containment ring 117 is shown, a similar ring may reside on the opposite side of the stator. The rotors are mounted to a bearing 128 and engaged with a shaft 131 that may in turn be engaged with a set of turbine blades. Although the generator is shown in a vertical orientation, one skilled in the art understands that such a generator may be used with vertical- or horizontal-axis turbines.

Referring to FIGS. 2, 3, 4, and 5, in an example embodiment, an axial-flux generator has an array of semi-disk-shaped rotor segments 110 with permanent magnets 112 and 114 arrayed in alternating polarity. The array of rotor segments 110 rotates proximal to and coaxially with an array of coils that make up a stator 116. As shown in FIG. 1, an array of semi-disk-shaped rotor segments may be mounted on both sides of the stator.

Figure 5:
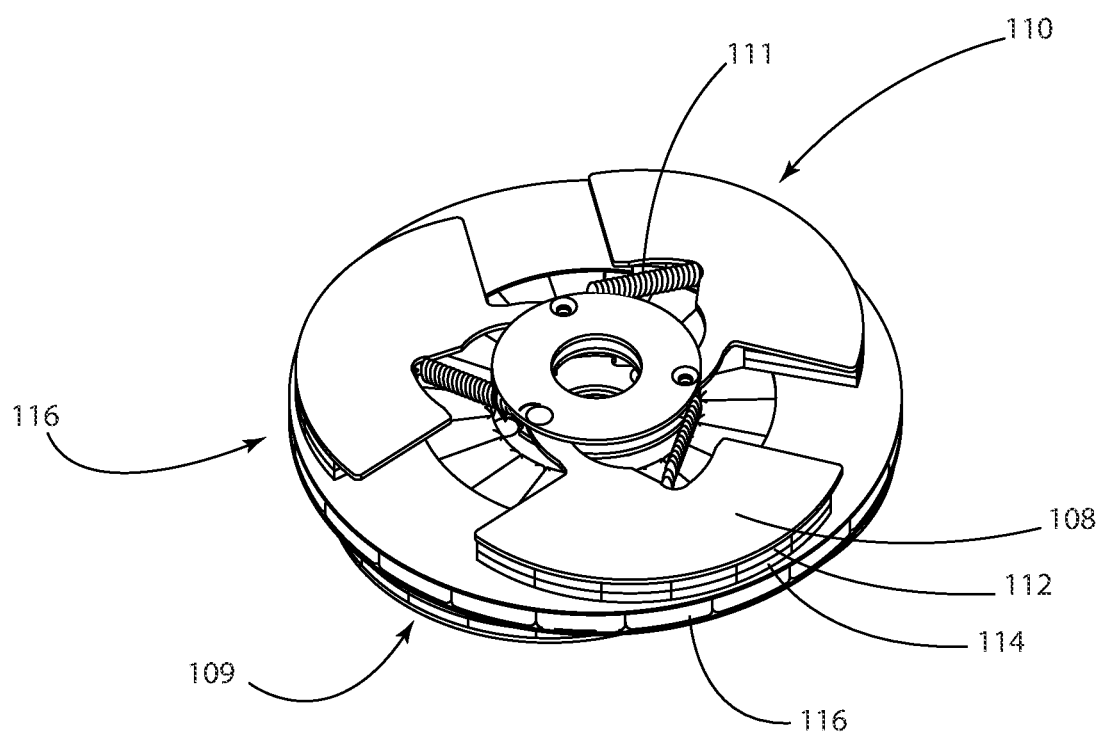
FIG. 5 is a perspective view of a rotor array and stator of the embodiment of FIG. 1, in an expanded configuration.

As a shaft rotates, the array of semi-disk-shaped rotor segments 110 rotates at an equivalent rotational velocity, generating electricity as the generator rotor segments 110 pass the stator 116. As the rotational velocity increases, centrifugal force causes the generator rotor segments 110 to move outward toward the outer diameter of the stator. Coil springs 111 are under tension at relatively higher rotational velocities and draw the rotor segments 110 toward the center as the turbine slows. One skilled in the art understands that effectively increasing the diameter of the generator rotor in this manner increases the torque on the generator and subsequently the electrical energy produced. One skilled in the art understands that gaps in the rotor segments that arise as rotor segments expand can be mitigated by having a rotor array on the opposite side of the stator. In FIG. 5 one can see, beneath the stator, a second rotor array 109 that is offset from the first rotor array 110.

Figure 2:
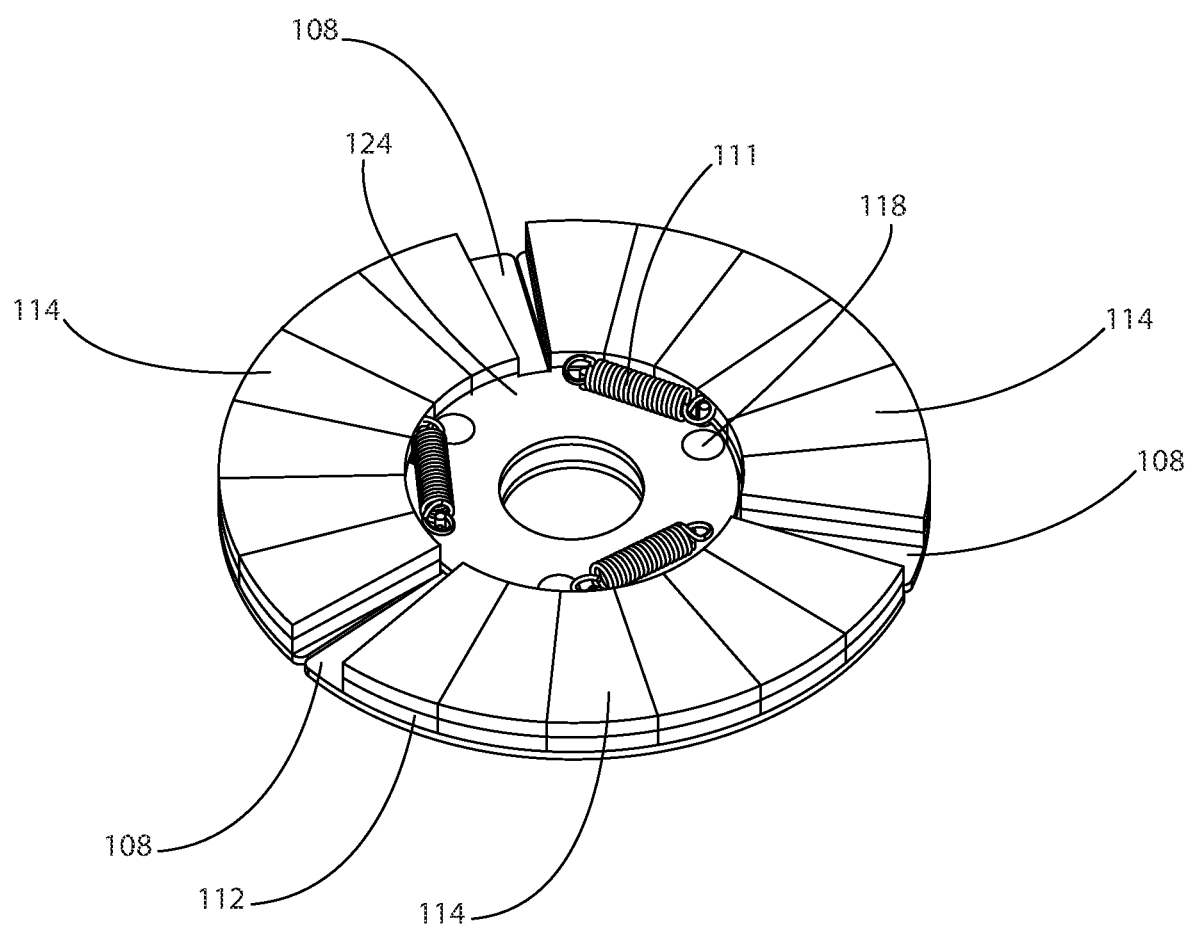
FIG. 2 is a perspective view of a rotor array of the embodiment of FIG. 1, in a collapsed configuration.
Figure 3:
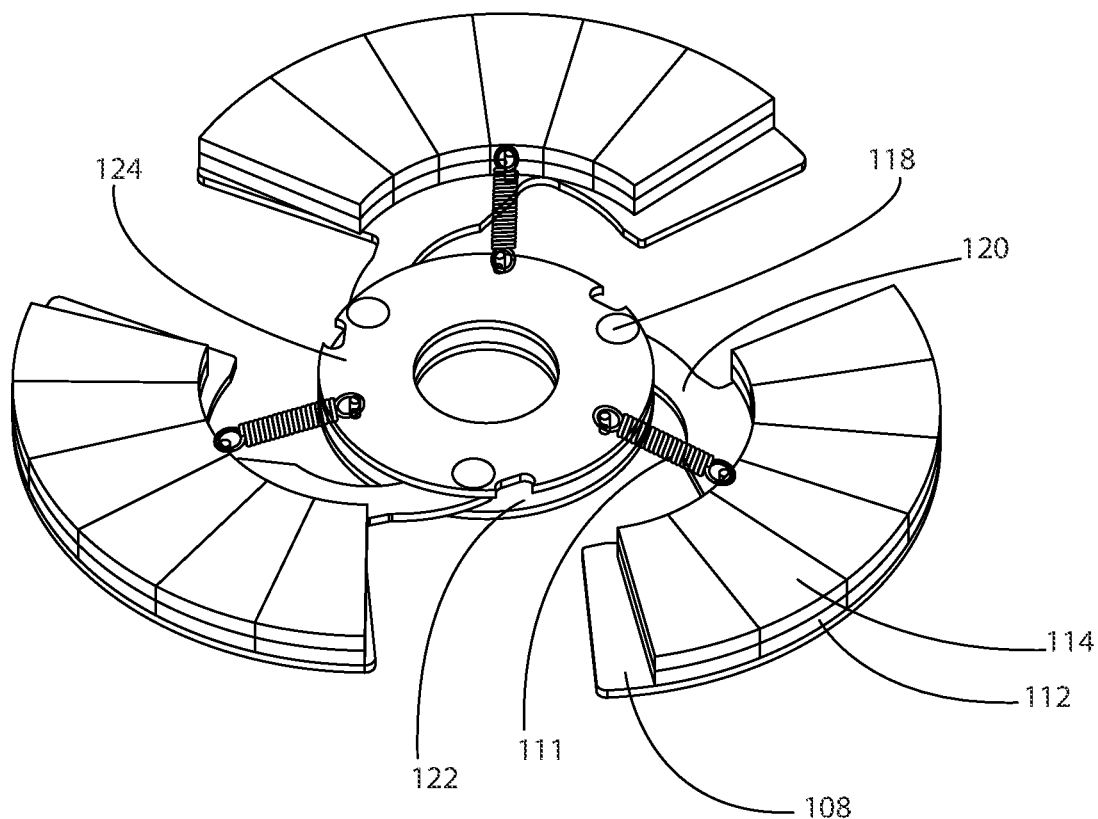
FIG. 3 is a perspective view of a rotor array of the embodiment of FIG. 1, in an expanded configuration.
Figure 4:
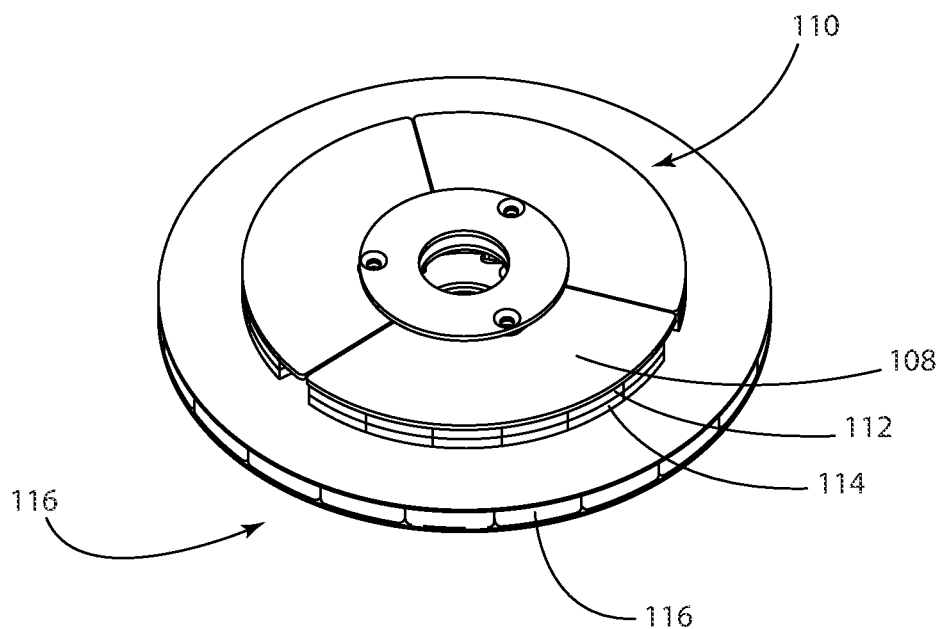
FIG. 4 is a perspective view of a rotor array and stator of the embodiment of FIG. 1, in a collapsed configuration.

FIGS. 2 and 3 show an array of permanent magnets 112 and 114, which are configured with alternating polarity, adjacent to back iron 108. The back iron 108 is joined to a hub 124 by arm segments 120 at pivot points 118. Coil springs 111 are affixed at one end to the hub 124 and, at the opposite end, to the arm 120. One skilled in the art understands that the springs keep the rotor arrays 110 in a normally collapsed position. As the rotational velocity of the drive shaft and rotor arrays 110 increases, the rotor arrays 110 pivot on pivot points 118 and move outward (FIG. 3) to form a rotor array of relatively greater diameter than that of the stator 116 (FIGS. 4 and 5).

Figure 6:
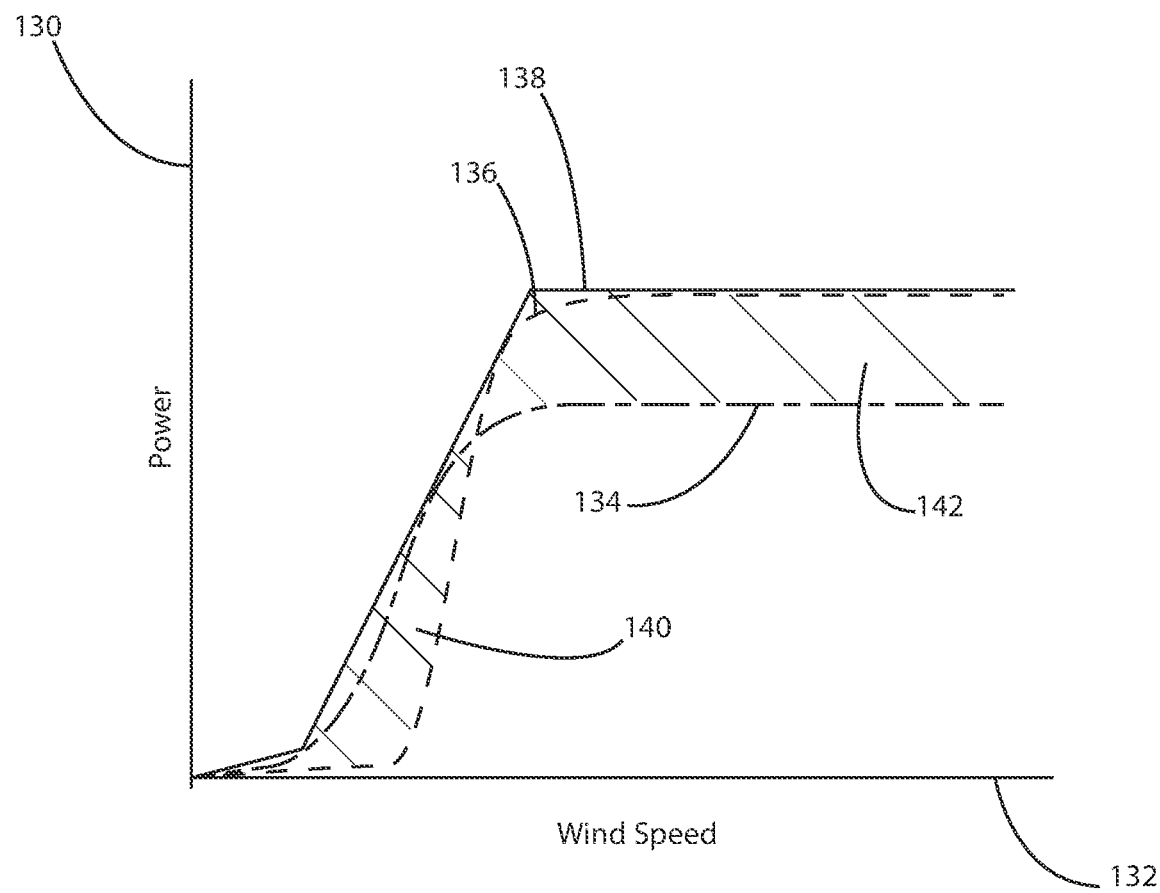
FIG. 6 is a diagram of an example power curve.

FIG. 6 is a graph depicting a power curve for an axial-flux permanent-magnet synchronous generator with a rotor array in a collapsed configuration 134 and in an expanded configuration 136. Power is measured on the vertical axis 130 and wind speed, relating to shaft rotational speed, is measured along the horizontal axis 132. A power curve representing a moving rotor array is illustrated by line 138. The areas shown in hash lines depict efficiency improvements from a lower cut-in speed 138 and a higher0rated output speed 136.

The invention claimed is:

1. A variable axial-flux permanent-magnet generator comprising:
   a drive shaft engaged with a rotational mechanical power source; and
   said drive shaft fixedly engaged and coaxial with a hub; and
   a disk-shaped stator fixedly positioned; and
   said hub coaxial with said disk-shaped stator; and
   at least one semi-disk-shaped rotor segment movably engaged with said hub and electrically coupled with said stator; wherein
   said stator is larger in diameter than said at least one semi-disk-shaped rotor segment and said at least one semi-disk shaped rotor segment is moved from a position proximal to the center of the disk-shaped stator to a position proximal to the perimeter of said disk-shaped stator by centrifugal force under relatively higher drive-shaft rotational velocities.

2. The variable axial-flux permanent-magnet generator of claim 1 further comprising:
   said disk-shaped stator having a first side and a second side; and
   at least a first semi-disk-shaped rotor segment; and
   at least a second semi-disk-shaped rotor segment; wherein
   said first semi-disk-shaped rotor segment is proximal to and electrically coupled with said disk-shaped stator first side; and
   said second semi-disk-shaped rotor segment is proximal to and electrically coupled with said disk-shaped stator second side; wherein the first semi-disk-shaped rotor segment is offset from the second semi-disk-shaped rotor segment.

3. The variable axial-flux permanent-magnet generator of claim 1 further comprising:
   said at least one semi-disk-shaped rotor segment is fixedly engaged with an arm that is pivotally engaged with said hub so that semi-disk-shaped rotor segment may move radially with respect to the disk-shaped stator as the semi-disk-shaped rotor segment pivots with respect to said hub.

4. The variable axial-flux permanent-magnet generator of claim 1 further comprising:
   a linear-motion guide fixedly engaged with said hub and slidably engaged with said at least one semi-disk-shaped rotor segment; wherein
   changes in rotational velocity of said drive shaft and said hub causes centrifugal force to increase or decrease, and to cause said at least one semi-disk-shaped rotor segment to move radially away from said disk-shaped stator.

5. A variable axial-flux permanent-magnet generator comprising:
   a stationary housing; and
   a drive shaft engaged with a rotational mechanical power source; and
   a disk-shaped stator fixedly engaged with said housing; and
   a hub engaged with and co-rotational with said drive shaft; and
   at least one semi-disk-shaped rotor segment engaged with a support structure and electrically coupled and proximal to said disk-shaped stator array; and said support structure pivotally engaged with said hub; wherein changes in the rotational velocity of said rotational mechanical power source cause a similar change in the rotational velocity of said hub, changing centrifugal force exerted on said at least one semi-disk-shaped rotor changing the position of said at least one semi-disk-shaped rotor with respect to said stator.

6. The variable axial-flux permanent-magnet generator of claim 5 further comprising:

at least one spring having a first end and a second end; and
said first end fixedly engaged with said support structure; and
said second end fixedly engaged with said hub; wherein
as said rotational mechanical power source increases in power output, said shaft and therefore said hub increase in rotational velocity; and said support structure and at least one semi-disk-shaped rotor pivots away from said hub by centrifugal force and moves away from the hub toward the perimeter of said disk-shaped stator.

7. The variable axial-flux permanent-magnet generator of claim 5 further comprising:

said disk-shaped stator having a first side and a second side; and
at least a first semi-disk-shaped rotor segment engaged with a support structure and electrically coupled and proximal to said disk-shaped stator array first side; and
a second semi-disk-shaped rotor segment engaged with a support structure and electrically coupled and proximal to said disk-shaped stator array second side.

8. The variable axial-flux permanent-magnet generator of claim 5 wherein:

said support structure is ferromagnetic and functions as a back iron.

9. A variable axial-flux permanent-magnet generator comprising:

a stationary housing; and
a drive shaft engaged with a rotational mechanical power source; and
a disk-shaped stator fixedly engaged with said housing; and
a hub engaged with and co-rotational with said drive shaft; and
an expandable rotor array electrically coupled with and proximal to said disk-shaped stator and further comprising:
at least one semi-disk shaped array of permanent magnets engaged with a planar structure; and
said planar structure having an arm; and
said arm pivotally engaged with said hub; and
a spring having a first end and a second end; and
said spring first end fixedly engaged with said arm; and
said spring second end fixedly engaged with said hub; wherein
as said mechanical power source increases in power output, said shaft increases in rotational velocity; said at least one expandable rotor moves away from a first position proximal to the hub toward a second position proximal to the perimeter of said disk-shaped stator.

* * * * *